United States Patent
Zhao et al.

(10) Patent No.: US 11,130,533 B2
(45) Date of Patent: Sep. 28, 2021

(54) GIANT GULLY-CROSSING VEHICLES FOR POLAR SCIENTIFIC EXPEDITION

(71) Applicants: Taiyuan University of Technology, Shanxi (CN); Polar Research Institute of China, Shanghai (CN); Taiyuan University of Science and Technology, Shanxi (CN)

(72) Inventors: Fuqiang Zhao, Shanxi (CN); Qingxue Huang, Shanxi (CN); Baoyu Chang, Taiyuan (CN); Pengyang Du, Shanxi (CN)

(73) Assignees: Taiyuan University of Science and Technology, Taiyuan (CN); Taiyuan University of Technology, Taiyuan (CN)

( * ) Notice: Subject to any disclaimer, the term of this patent is extended or adjusted under 35 U.S.C. 154(b) by 280 days.

(21) Appl. No.: 16/447,963

(22) Filed: Jun. 21, 2019

(65) Prior Publication Data
US 2020/0208359 A1    Jul. 2, 2020

(30) Foreign Application Priority Data
Jan. 2, 2019   (CN) .......................... 20191000770.9

(51) Int. Cl.
*B62D 57/032*   (2006.01)
*B62D 55/065*   (2006.01)
*E01D 15/127*   (2006.01)

(52) U.S. Cl.
CPC ......... *B62D 57/032* (2013.01); *B62D 55/065* (2013.01); *E01D 15/127* (2013.01)

(58) Field of Classification Search
CPC ........................... B62D 57/032; B62D 55/062
See application file for complete search history.

(56) References Cited

U.S. PATENT DOCUMENTS 10,913,502 B2 *   2/2021   Zhao .................... B62D 55/062
2015/0041227 A1   2/2015   Jun et al.

FOREIGN PATENT DOCUMENTS

| CN | 205661562 U |   | 10/2016 |
| CN | 106476927 A | * | 3/2017 |
| CN | 207274801 U |   | 4/2018 |
| CN | 109398524 A | * | 3/2019 |
| CN | 109398526 A | * | 3/2019 |
| CN | 110525533 A | * | 12/2019 |
| CN | 111169559 A | * | 5/2020 |
| CN | 210828536 U | * | 6/2020 |

* cited by examiner

*Primary Examiner* — Kevin Hurley

(57) ABSTRACT

A giant gully-crossing vehicle for polar scientific expeditions, including a gully-crossing bridge and a vehicle body. The vehicle body includes a stage and a travelling portion. The stage includes a top platform, a front bottom plate, a rear bottom plate and a multifunctional lock platform assembly. The front bottom plate and the rear bottom plate are capable of sliding independently relative to the top platform. The travelling portion includes a first travelling component, a second travelling component, a third travelling component, a fourth travelling component, a fifth travelling component and a sixth travelling component which are symmetrically provided at left and right sides of the stage and below the stage. Bridge bodies of the bridge components can be assembled to two gully-crossing bridges, and are connected to the multifunctional lock platform assembly when crossing gullies.

9 Claims, 8 Drawing Sheets

GIANT GULLY-CROSSING VEHICLES FOR POLAR SCIENTIFIC EXPEDITION

CROSS-REFERENCE TO RELATED APPLICATIONS

This application claims the benefit of priority from Chinese Patent Application No. CN201910000770.9, filed on Jan. 2, 2019. The content of the aforementioned application, including any intervening amendments thereto, is incorporated herein by reference in its entirety.

TECHNICAL FIELD

The present invention relates to multi-legged polar vehicles, and more particular to a giant gully-crossing vehicle for polar scientific expeditions.

REARGROUND OF THE INVENTION

As the polar land is almost completely covered by ices and snows, there are many ice barriers on the surfaces of the polar earth, causing a rugged surface. Due to positions of scientific expedition stations and small-sized polar vehicles, the polar vehicles can only be driven within a small area near the scientific expedition stations, which cannot meet requirements of the scientific expeditions in large regions. Moreover, many crevasses with different widths exist on the polar ground; however, the existing polar vehicles are in a small size, which cannot cross wide gullies and may fall into the crevasses during driving, thus causing accidents.

SUMMARY OF THE INVENTION

The present invention aims to provide a giant gully-crossing vehicle for polar scientific expeditions, which meets the requirements for scientific expeditions under complex geological conditions of long distance and large area in the polar land, especially for crossing crevasses and gullies and avoiding obstacles.

The present invention provides a giant gully-crossing vehicle for polar scientific expeditions, comprising a vehicle body and a gully-crossing bridge.

The vehicle body comprises a stage and a travelling portion. The stage comprises a top platform, a front bottom plate, a rear bottom plate and a multifunctional lock platform assembly. The travelling portion comprises a first travelling component, a second travelling component, a third travelling component, a fourth travelling component, a fifth travelling component and a sixth travelling component which are symmetrically provided at left and right sides of the stage and below the stage. The gully-crossing bridge comprises a first bridge component, a second bridge component, a third bridge component, a fourth bridge component, a fifth bridge component and a sixth bridge component which are symmetrically provided on left and right outer sides of the stage.

The first bridge component comprises a first bridge body, a first rotation and extension mechanism, a first bridge underside lock mechanism and a first bridge inner side lock mechanism. One end of the first rotation and extension mechanism is connected to a front portion of a left side of the top platform, and the other end of the first rotation and extension mechanism is connected to the first bridge body. A first bridge motor is provided at a joint between the first rotation and extension mechanism and the first bridge body, and is configured to adjust pitching of a bridge surface. The first rotation and extension mechanism is configured to rotate and extend the first bridge body. The first bridge underside lock mechanism is provided under a tail of the first bridge body. The first bridge inner side lock mechanism is provided at an inner side of the tail of the first bridge body. The second bridge component symmetrical to the first bridge component is provided at a right side of the top platform.

The third bridge component comprises a third bridge body, a third rotation and extension mechanism, a third bridge underside lock mechanism and a third bridge inner side lock mechanism. One end of the third rotation and extension mechanism is connected to a middle portion of a left side of the top platform, and the other end of the third rotation and extension mechanism is connected to the third bridge body. A third bridge motor is provided at a joint between the third rotation and extension mechanism and the third bridge body, and is configured to adjust the pitching of the bridge surface. The third rotation and extension mechanism is configured to rotate and extend the third bridge body. The third bridge underside lock mechanism is provided below the third bridge body, and is configured to cooperate with the first bridge underside lock mechanism and a fifth bridge underside lock mechanism for a bridge locking operation. The third bridge inner side lock mechanism is provided at an inner side of the third bridge body, and is configured to cooperate with the first bridge inner side lock mechanism and a fifth bridge inner side lock mechanism for the bridge locking operation. The fourth bridge component symmetrical to the third bridge component is provided at a right side of the top platform.

The fifth bridge component comprises a fifth bridge body, a fifth rotation and extension mechanism, a fifth bridge underside lock mechanism and a fifth bridge inner side lock mechanism. One end of the fifth rotation and extension mechanism is connected to a rear portion of the left side of the top platform, and the other end of the fifth rotation and extension mechanism is connected to the fifth bridge body. A fifth bridge motor is provided at a joint between the fifth rotation and extension mechanism and the fifth bridge body, and is configured to adjust the pitching of the bridge surface. The fifth rotation and extension mechanism is configured to rotate and extend the fifth bridge body. The fifth bridge underside lock mechanism is provided under a head portion of the fifth bridge body. The fifth bridge inner side lock mechanism is provided at a right side of the head portion of the fifth bridge body. The sixth bridge component symmetrical to the fifth bridge component is provided at the right side of the top platform.

The front bottom plate is provided on a bottom of a front portion of the top platform and is capable of sliding rear and forth relative to the top platform. The rear bottom plate is provided on a bottom of a rear portion of the top platform and is capable of sliding rear and forth relative to the top platform. The multifunctional lock platform assembly comprises a multifunctional lock platform transport mechanism, a multifunctional lock platform lifting mechanism and a multifunctional lock platform. A top of the multifunctional lock platform transport mechanism is fixed to the bottom of the top platform, and a bottom of the multifunctional lock platform transport mechanism is connected to a top of the multifunctional lock platform lifting mechanism. The multifunctional lock platform transport mechanism is configured to move the multifunctional lock platform lifting mechanism rear and forth. A multifunctional lock platform is provided on a bottom of the multifunctional lock platform lifting mechanism configured to lift the multifunctional lock platform.

The first travelling component comprises a first rotation support, a first telescopic support, a first auxiliary support and a first crawler travelling foot. An upper end of the first rotation support is connected to a bottom of a left front portion of the front bottom plate, and a lower end of the first rotation support is connected to an upper end of the first telescopic support. A lower end of the first telescopic support is fixed to an upper end of the first crawler travelling foot, and the first telescopic support is capable of sliding up and down relative to the first rotation support. An upper end of the first auxiliary support is provided at an outer side of the first rotation support, and a lower end of the first auxiliary support is connected to the lower end of the first telescopic support. The upper end of the first auxiliary support is capable of sliding up and down relative to the first rotation support, and an upper end of a support rod can be locked at any position of a sliding groove of the rotation support. The second travelling component symmetrical to the first travelling component is provided at a bottom of a right front portion of the front bottom plate.

The third travelling component comprises a third rotation support, a third telescopic support, a third auxiliary support and a third crawler travelling foot. An upper end of the third rotation support is connected to a bottom of a left middle portion of the top platform, and a lower end of the third rotation support is connected to an upper end of the third telescopic support. A lower end of the third telescopic support is fixed to an upper end of the third crawler travelling foot, and the third telescopic support is capable of sliding up and down relative to the third rotation support. An upper end of the third auxiliary support is provided at an outer side of the third rotation support, and a lower end of the third auxiliary support is connected to the lower end of the third telescopic support. The upper end of the third auxiliary support is capable of sliding up and down relative to the third rotation support. The fourth travelling component symmetrical to the third travelling component is provided at a bottom of a right middle portion of the top platform.

The fifth travelling component comprises a fifth rotation support, a fifth telescopic support, a fifth auxiliary support and a fifth crawler travelling foot. An upper end of the fifth rotation support is connected to a bottom of a left rear portion of the rear bottom plate, and a lower end of the fifth rotation support is connected to an upper end of the fifth telescopic support. A lower end of the fifth telescopic support is fixed to an upper end of the fifth crawler travelling foot, and the fifth telescopic support is capable of sliding up and down relative to the fifth rotation support. An upper end of the fifth auxiliary support is provided at an outer side of the fifth rotation support, and a lower end of the fifth auxiliary support is connected to the lower end of the fifth telescopic support. The upper end of the fifth auxiliary support is capable of sliding up and down relative to the fifth rotation support. The sixth travelling component symmetrical to the fifth travelling component is provided at a bottom of a right rear portion of the rear bottom plate.

The multifunctional lock platform assembly comprises the multifunctional locking platform transport mechanism, the multifunctional lock platform lifting mechanism and the multifunctional lock platform. The multifunctional lock platform comprises a lock platform body and an extension lock member. Four holders are provided at left and right sides of the lock platform body, and the extension lock member is provided below the holders and is configured to lock the gully-crossing bridge.

Figure 1:
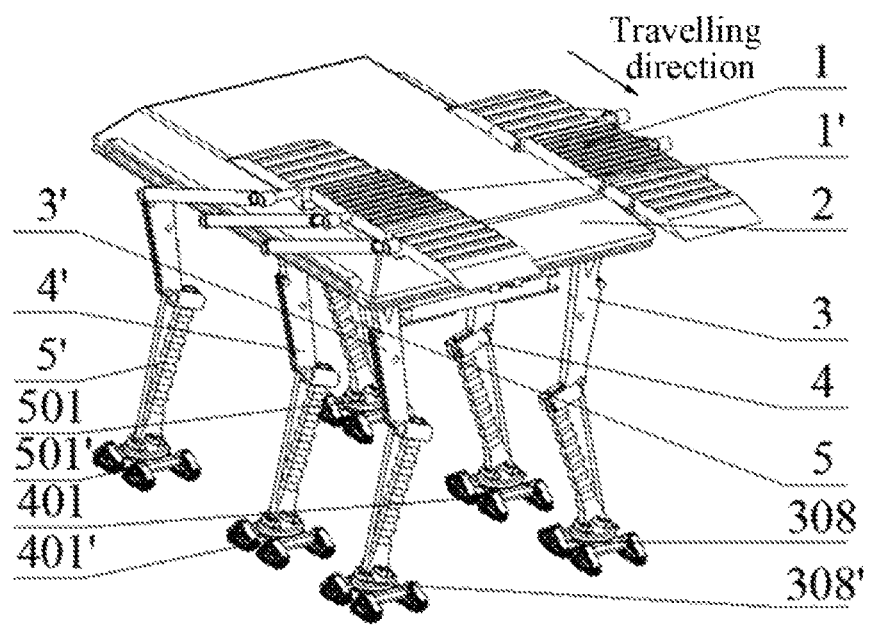
FIG. 1 is a perspective view from the top of a giant gully-crossing vehicle in an initial position according to the present invention.

In the drawings: 1-left gully-crossing bridge, 1'—right gully-crossing bridge, 2—stage, 3—first travelling component, 3'—second travelling component, 4—third travelling component, 4'—fourth travelling component, 5—fifth travelling component, 5'—sixth travelling component, 101—first bridge motor shaft, 101'—second bridge motor shaft, 102—third bridge motor shaft, 102'—fourth bridge motor shaft, 103—fifth bridge electronic control rotation and extension mechanism, 103'—sixth bridge electronic control rotation and extension mechanism, 104—fifth bridge motor, 104'—sixth bridge motor, 105—third bridge electronic control rotation and extension mechanism, 105'—fourth bridge electronic control rotation and extension mechanism, 106—first bridge motor shaft, 106'—second bridge motor shaft, 107—third bridge motor, 107'—fourth bridge motor, 108—first bridge electronic control rotation and extension mechanism, 108'—second bridge electronic control rotation and extension mechanism, 109—first bridge motor, 109'—second bridge motor, 110—fifth bridge body, 110'—sixth bridge body, 111—third bridge body, 111'—fourth bridge body, 112—first bridge body, 112'—second bridge body, 113—first bridge underside lock mechanism, 113'—second bridge underside lock mechanism, 114—third bridge underside lock mechanism, 114'—fourth bridge underside lock mechanism, 115—fifth bridge underside lock mechanism, 115'—sixth bridge underside lock mechanism, 116—first bridge inner side lock mechanism, 116'—second bridge inner side lock mechanism, 117—third bridge inner side lock mechanism, 117'—fourth bridge inner side lock mechanism, 118—fifth bridge inner side lock mechanism, 118'—sixth bridge inner side lock mechanism, 119—left side lock pin, 119'—right side lock pin, 120—left underside lock pin, 120'—right underside lock pin, 201—top platform, 202—multifunctional lock platform transport mechanism, 203—front bottom plate, 204—hollow front bottom plate groove, 205—rear bottom plate, 206—hollow rear bottom plate groove, 207—multifunctional lock platform lifting mechanism, 208—multifunctional lock platform, 209—holder, 210—extension lock member, 301—rotation support base, 302—rotation support, 303—electric drive gear lifting mechanism, 304—telescopic support, 305—auxiliary support, 306—lower position limit member, 307—upper position limit member, 308—first crawler travelling foot, 308'—second crawler travelling foot, 401—third crawler travelling foot, 401'—fourth crawler travelling foot, 501—fifth crawler travelling foot, 501'—sixth crawler travelling foot.

DETAILED DESCRIPTION OF EMBODIMENTS

The embodiments of the present will be described in detail with reference to the accompanying drawings.

Figure 2:
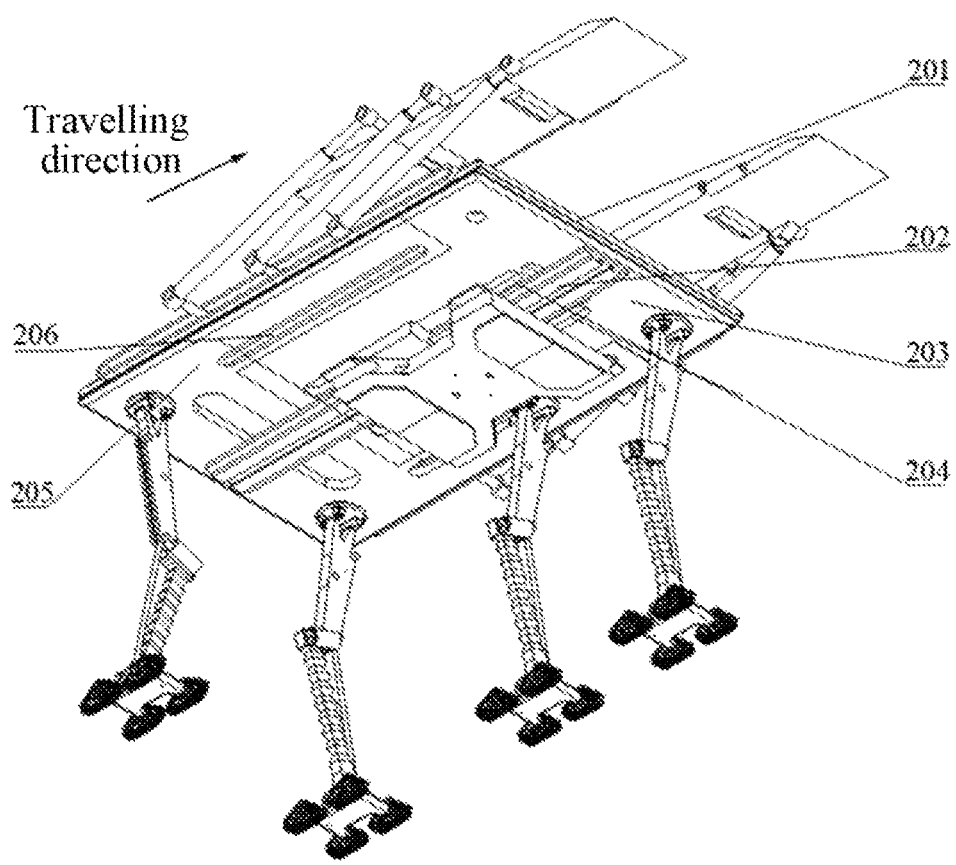
FIG. 2 is a perspective view from the bottom of the giant gully-crossing vehicle in the initial position according to the present invention.

As shown in FIGS. 1-2, a gully-crossing vehicle in which a gully-crossing bridge is in an initial position is illustrated. The left and right gully-crossing bridges 1, 1' are respectively connected to two sides of the stage 2. Upper ends of the first and second travelling components 3, 3' are respectively connected to two sides of a front portion of a bottom of the front bottom plate 203. Upper ends of the third and fourth travelling components 4, 4' are respectively connected to two sides of a middle portion of a bottom of the top platform 201 through a hollow rear bottom plate groove 206. Upper ends of the fifth and sixth travelling components 5, 5' are respectively connected to two sides of a rear portion of a bottom of the rear bottom plate 205. A top of the multifunctional lock platform transport mechanism 202 is connected to a middle portion of a bottom of the top platform 201 through a hollow front bottom plate groove 204. The first and second crawler travelling feet 308, 308' are respectively provided at lower ends of the first and second travelling components 3, 3'. The third and fourth crawler travelling feet 401, 401' are respectively provided at lower ends of the third and fourth travelling component 4, 4'. The fifth and sixth crawler travelling feet 501, 501' are respectively provided at lower ends of the fifth and sixth travelling components 5, 5'.

Figure 3:
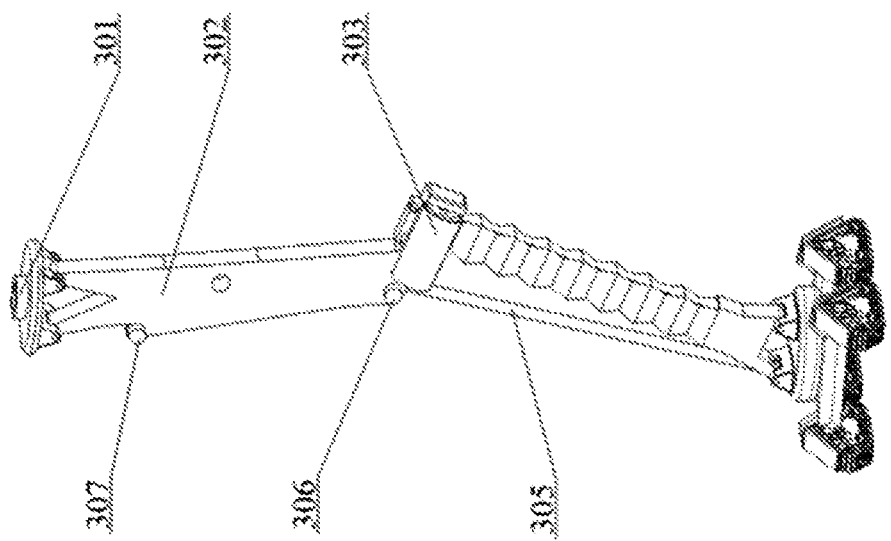
FIG. 3 is a schematic diagram of a travelling component in which a telescopic support is in an initial position according to the present invention.
Figure 4:
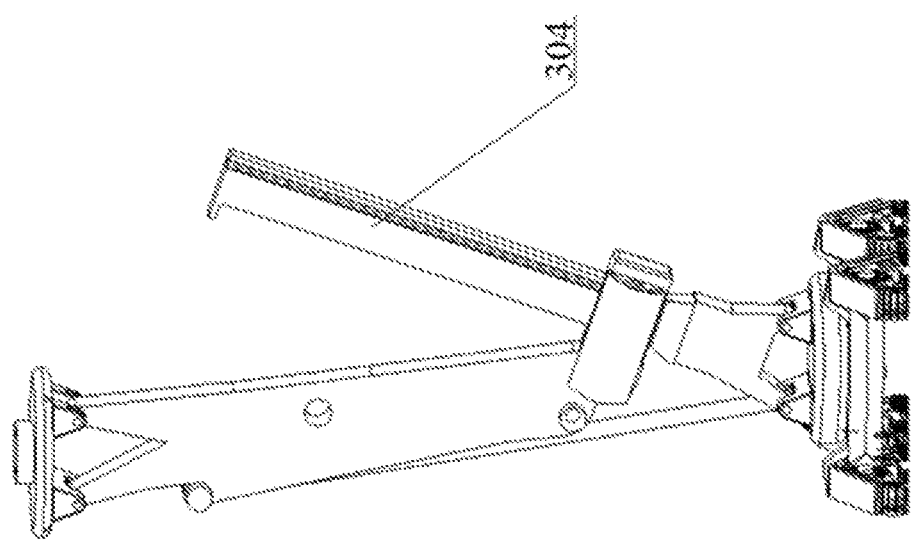
FIG. 4 is a schematic diagram of the travelling component in which the telescopic support is in a lifting position according to the present invention.

As shown in FIGS. 3-4, a first travelling component in which the telescopic support is in initial and lifting positions is illustrated. The rotation support base 301 is connected to the rotation support 302. The electric drive gear lifting mechanism 303 is provided at a rear side of a lower end of the rotation support 302. The telescopic support 304 is connected to a lower end of the rotation support 304. A lower end of the auxiliary support 305 is connected to the lower end of the telescopic support 304. An upper end of the auxiliary support 305 is connected to a left side of the rotation support 302. Lower and upper position limit members 306, 307 are respectively provided at upper and lower ends of a left side of the rotation support 302.

Figure 5:
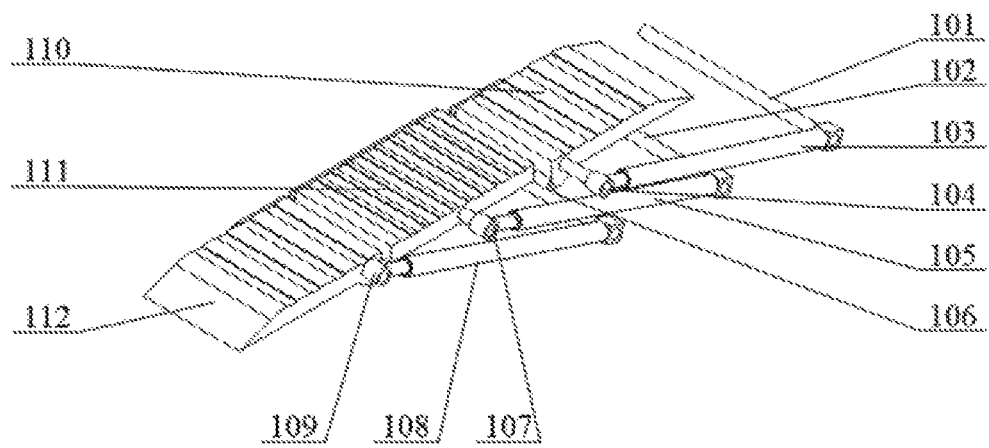
FIG. 5 is a perspective view from the top of a left gully-crossing bridge in which the gully-crossing bridge is in the initial position according to the present invention.
Figure 6:
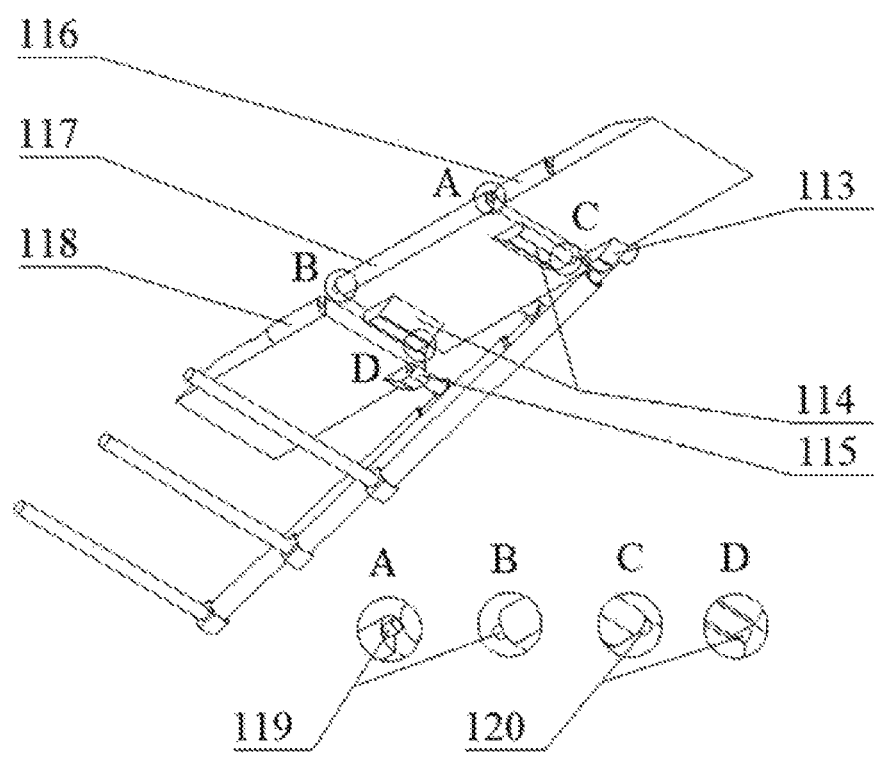
FIG. 6 is a perspective view from the bottom of the left gully-crossing bridge in which the gully-crossing bridge is in the initial position according to the present invention.

As shown in FIGS. 5-6, a left gully-crossing bridge in which the gully-crossing bridge is in an initial position is illustrated. The fifth bridge motor shaft 101 is connected to one end of the fifth bridge electronic control rotation and extension mechanism 103, and the other end of the fifth bridge electronic control rotation and extension mechanism 103 is connected to the fifth bridge motor 104 fixed at a front end of a left side of the fifth bridge body 110. The third bridge motor shaft 102 is connected to one end of the third bridge electric control rotation and extension mechanism 105, and the other end of the third bridge electric control rotation and extension mechanism 105 is connected to the third bridge motor 107 fixed at a middle portion of a left side of the third bridge body 111. The first bridge motor shaft 106 is connected to one end of the first bridge electric control rotation and extension mechanism 108, and the other end of the first bridge electric control rotation and extension mechanism 108 is connected to the first bridge motor 109 fixed at a rear end of a left side of the first bridge body 112. The first bridge underside lock mechanism 113 is provided at a left side of a tail of a bottom of the first bridge body 112, and the first bridge inner side lock mechanism 116 is provided at a right side of a tail of the first bridge body 112. The third bridge underside lock mechanism 114 is provided at head and tails of a bottom of the third bridge body 111, and the third bridge inner side lock mechanism 117 is provided at a right side of the third bridge body 111. The fifth bridge underside lock mechanism 115 is provided at a left side of a head portion of a bottom of the fifth bridge body 110, and the fifth bridge inner side lock mechanism 118 is provided at a right side of a head portion of the fifth bridge body 110. The fifth bridge underside lock mechanism 114 is provided with a left underside lock pin 120, and the left middle bridge inner side lock mechanism 117 is provided with a left side lock pin 119.

Figure 7:
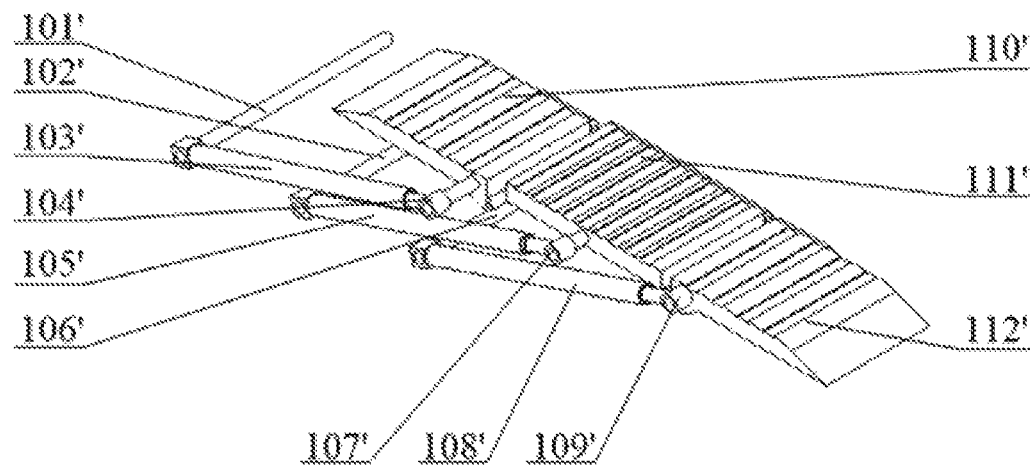
FIG. 7 is a perspective view from the top of a right gully-crossing bridge in which the gully-crossing bridge is in the initial position according to the present invention.
Figure 8:
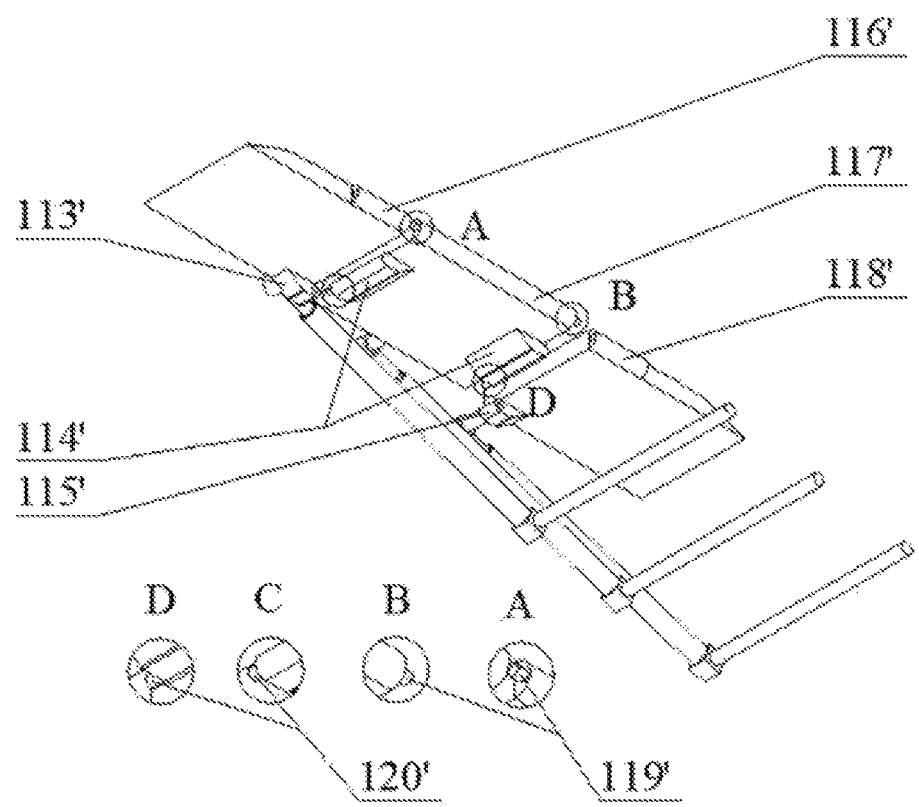
FIG. 8 is a perspective view from the bottom of the right gully-crossing bridge in which the gully-crossing bridge is in the initial position according to the present invention.

As shown in FIGS. 7-8, a right gully-crossing bridge in which the gully-crossing bridge is in the initial position is illustrated. The sixth bridge motor shaft 101' is connected to one end of the sixth bridge electronic control rotation and extension mechanism 103', and the other end of the sixth bridge electronic control rotation and extension mechanism 103' is connected to the sixth bridge motor 104' fixed at a front end of a right side of the sixth bridge body 110'. The fourth bridge motor shaft 102' is connected to one end of the fourth bridge electric control rotation and extension mechanism 105', and the other end of the fourth bridge electric control rotation and extension mechanism 105' is connected to the fourth bridge motor 107' fixed at a middle portion of a right side of the fourth bridge body 111'. The second bridge motor shaft 106' is connected to one end of the second bridge electric control rotation and extension mechanism 108', and the other end of the second bridge electric control rotation and extension mechanism 108' is connected to the second bridge motor 109' fixed at a rear end of a right side of the second bridge body 112'. The second bridge underside lock mechanism 113' is provided at a right side of a tail of a bottom of the second bridge body 112', and the second bridge inner side lock mechanism 116' is provided at a left side of the tail of the second bridge body 112'. The fourth bridge underside lock mechanism 114' is provided at head and tails of a bottom of the fourth bridge body 111', and the fourth bridge inner side lock mechanism 117' is provided at a left side of the fourth bridge body 111'. The sixth bridge underside lock mechanism 115' is provided at a right side of a head portion of a bottom of the sixth bridge body 110', and the sixth bridge inner side lock mechanism 118' is provided at a left side of a head portion of the sixth bridge body 110'. The fourth bridge underside lock mechanism 114' is provided with a right underside lock pin 120', and the fourth bridge inner side lock mechanism 117' is provided with a right side lock pin 119'.

Figure 9:
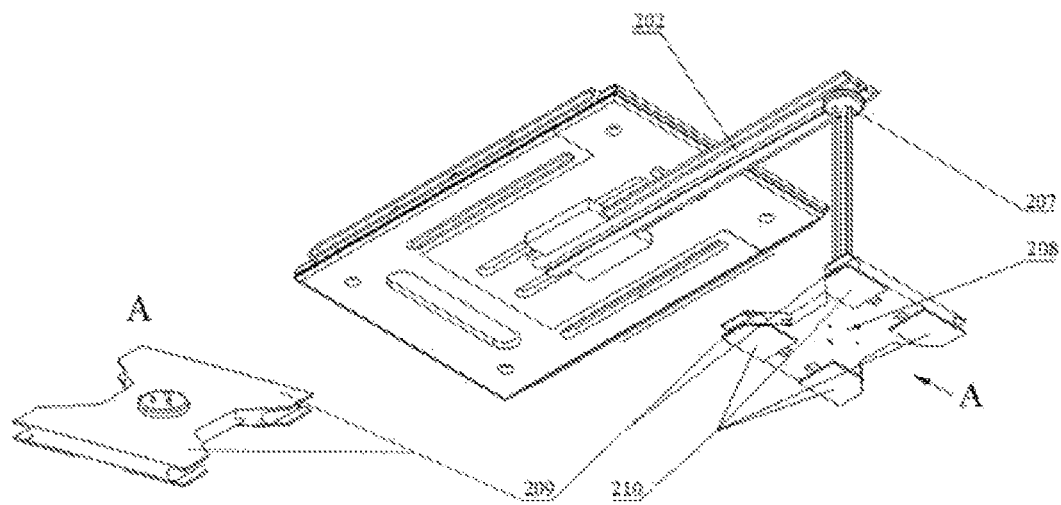
FIG. 9 is a schematic diagram of a multifunctional lock platform assembly in which the gully-crossing bridge is locked according to the present invention.

As shown in FIG. 9, the multifunctional lock platform assembly of the present invention in which the gully-crossing bridge is locked is illustrated. An upper end of the multifunctional lock platform lifting mechanism 207 is connected to a bottom of the multifunctional lock platform transport mechanism 202. A lower end of the multifunctional lock platform lifting mechanism 207 is connected to the multifunctional lock platform 208. Holders 209 are provided at two sides of the multifunctional lock platform 208, and a extension lock member 210 is provided below the holders 209.

Figure 10:
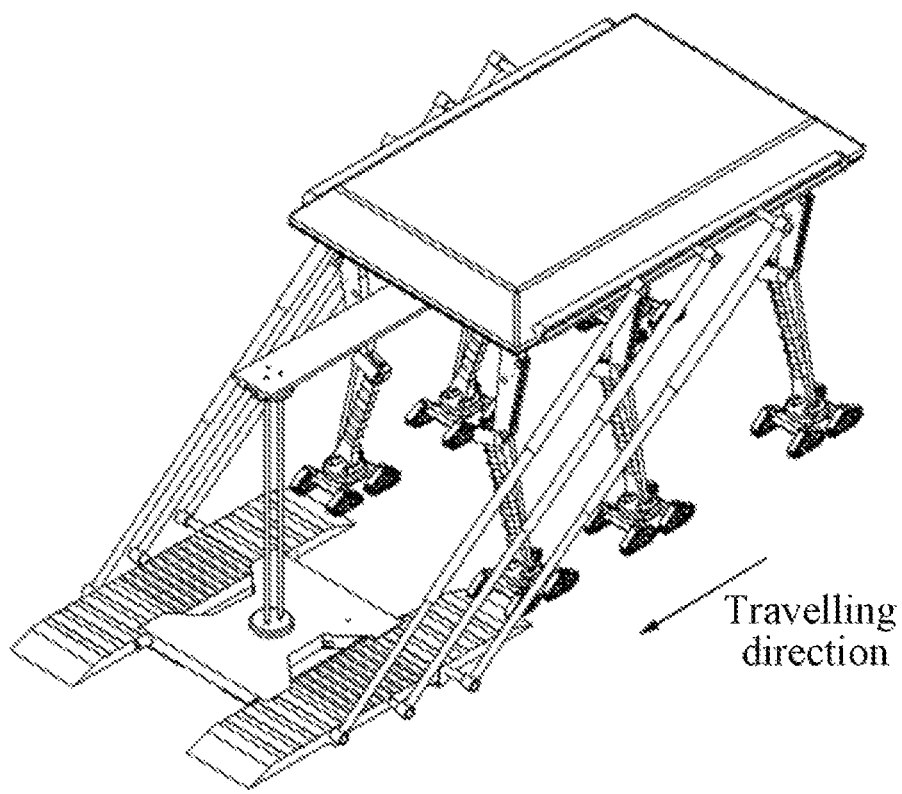
FIG. 10 is a perspective view of the gully crossing vehicle in which the gully-crossing bridge is bridging in front of a vehicle body according to the present invention.

FIG. 10 is a perspective view of the gully crossing vehicle in which the gully-crossing bridge is bridging in front of a vehicle body according to the present invention.

Figure 11:
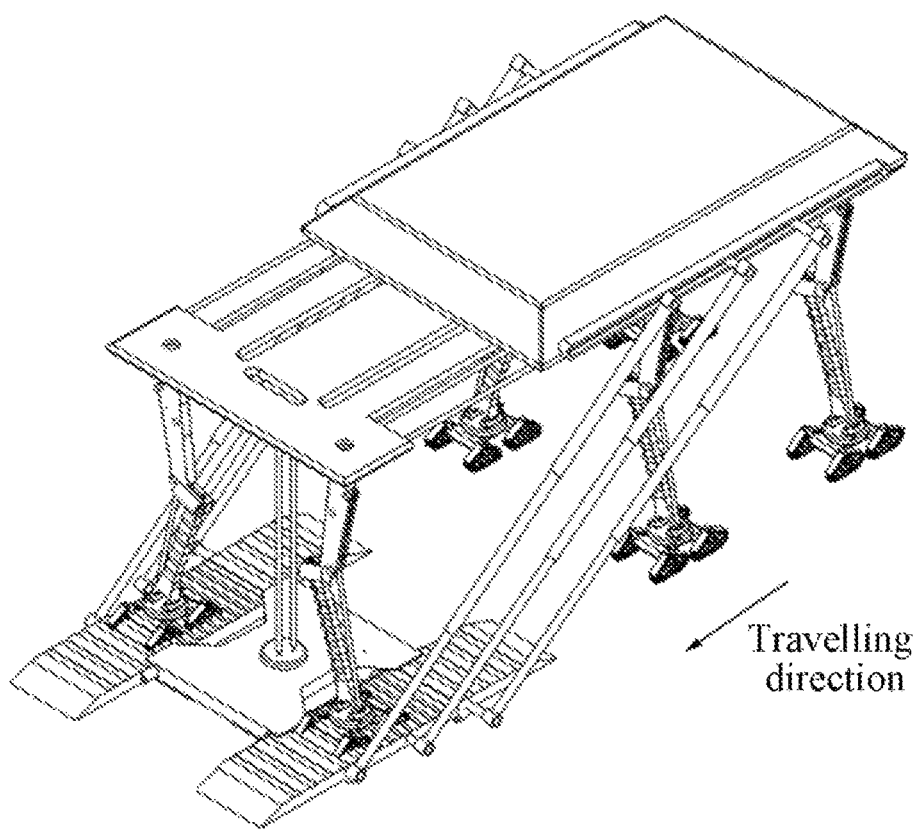
FIG. 11 is a schematic diagram of the gully-crossing vehicle in which the first and second crawler travelling feet are travelling on the gully-crossing bridge.

FIG. 11 is a schematic diagram of the gully-crossing vehicle in which the first and second crawler travelling feet are travelling on the gully-crossing bridge.

Figure 12:
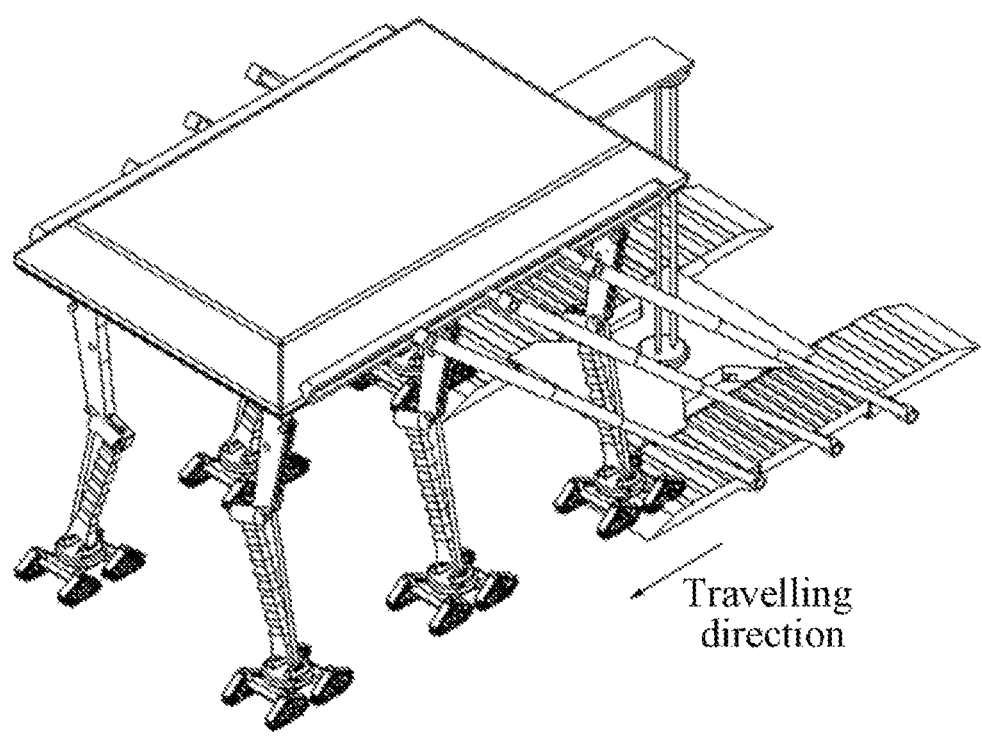
FIG. 12 is a schematic diagram of the gully-crossing vehicle in which the gully-crossing bridge is bridging after the gully-crossing vehicle has crossed a gully.

FIG. 12 is a schematic diagram of the gully-crossing vehicle in which the gully-crossing bridge is bridging after the gully-crossing vehicle has crossed a gully.

The specific operation process of the present invention comprises: lifting the crawler travelling feet, dropping the crawler travelling feet, prearranging the fifth and sixth bridge bodies, prearranging the third and fourth bridge bodies, prearranging the first and second bridge bodies, locking the bridge body, bridging, crossing gullies, lifting and unlocking the bridge body, withdrawing the first and second bridge bodies, withdrawing the third and fourth bridge bodies, withdrawing the fifth and sixth bridge bodies.

Lifting the crawler travelling feet is described as follows. The upper end of the auxiliary support 305 is unlocked, and after the electric drive gear lifting mechanism 303 is unlocked, it rotates forward to drive the telescopic support 304 to move upwardly. When the upper end of the auxiliary support 305 reaches the upper position limit member 307, the electric drive gear lifting mechanism 303 stops rotating and is locked, and the upper end of the auxiliary support 305 is locked.

Dropping the crawler travelling feet is described as follows. The upper end of the auxiliary support 305 is unlocked, and after the electric drive gear lifting mechanism 303 is unlocked, it rotates reversely to drive the telescopic support 304 to move downwards. When the upper end of the auxiliary support 305 reaches the lower position limit member 306, the electric drive gear lifting mechanism 303 stops rotating and is locked, and the upper end of the auxiliary support 305 is locked.

Prearranging the fifth and sixth bridge bodies is described as follows. The fifth and sixth bridge electronic control rotation and extension mechanisms 103, 103' are unlocked to rotate, and drive the fifth and sixth bridge bodies 110, 110' to rotate outwardly by 90°, so that the fifth and sixth bridge bodies are in a vertical state, and then the rotation is locked again. The fifth and sixth bridge motor shafts 101, 101' are unlocked and are rotated to a prearranging bridge position, and then they are locked again. The fifth and sixth electronic control rotation and extension mechanisms 103, 103' are unlocked to move and extend to the prearranging bridge position, and then the movement are locked again. The fifth and sixth electronic control rotation and extension mechanisms 103, 103' are unlocked to rotate and drive the fifth and sixth bridge bodies 110, 110' to rotate reversely by 90° to return to the initial position, and then the rotation is locked again. The fifth and sixth bridge motors 104, 104' are unlocked and rotate to adjust the fifth and sixth bridge bodies 110, 110', so that the fifth and sixth bridge bodies are in a horizontal state and then are locked again.

Prearranging the third and fourth bridge bodies is described as follows. The third and fourth bridge electronic control rotation and extension mechanisms 105, 105' are unlocked to rotate, and drive the third and fourth bridge bodies 111, 111' to rotate outwardly by 90°, so that the third and fourth bridge bodies are in a vertical state, and then the rotation is locked again. The third and fourth bridge motor shafts 102, 102' are unlocked and are rotated to a prearranging bridge position, and then they are locked again. The third and fourth electronic control rotation and extension mechanisms 105, 105' are unlocked to move and extend to the prearranging bridge position, and then the movement is locked again. The third and fourth electronic control rotation and extension mechanisms 105, 105' are unlocked to rotate and drive the third and fourth bridge bodies 111, 111' to rotate reversely by 90° to return to the initial position, and then the rotation is locked again. The third and fourth bridge motors 107, 107' are unlocked and rotate to adjust the third and fourth bridge bodies 111, 111', so that the third and fourth bridge bodies are in a horizontal state, and then the third and fourth bridge motors are locked again.

Prearranging the first and second bridge bodies is described as follows. The first and second bridge motor shafts 106, 106' are unlocked and rotate to a prearranging bridge position, and then they are locked again. The first and second bridge electronic control rotation and extension mechanisms 108, 108' are unlocked to rotate and extend to the prearranging bridge position, and then they are locked again. The first and second bridge motors 109, 109' are unlocked and rotate to adjust the first and second bridge body 112, 112', so that the first and second bridge bodies 112, 112' are in a horizontal state, and then the first and second bridge motors are locked again.

Locking the bridge body is described as follows. The multifunctional lock platform transport mechanism 202 is unlocked to move, and the multifunctional lock platform lifting mechanism 20 moves towards the front of the gully-crossing vehicle and stops at the prearranged bridge, and then the multifunctional lock platform transport mechanism is locked again. The multifunctional lock platform 208 is dropped from the multifunctional lock platform lifting mechanism 207. When the holders 209 overlap the gully-crossing bridge, the extension lock member 210 extends to lock the gully-crossing bridge. The third and fourth bridge underside lock mechanisms 114, 114' extend the left and right underside lock pins 120, 120' to insert into the first, second, fifth and sixth bridge underside lock mechanisms 113, 113', 115, 115'. The third and fourth inner side lock mechanisms 117, 117' extend the left and right side lock pins 119, 119' to insert into the first, second, fifth and sixth bridge inner side lock mechanisms 116, 116', 118, 118'.

Bridging is described as follows. The first, second, third, fourth, fifth and sixth bridge motor shafts 106, 106', 102, 102', 101, 101' are unlocked. The first, second, third, fourth, fifth and sixth bridge electronic control rotation and extension mechanisms 108, 108', 105, 105', 103, 103' are unlocked to move. The first, second, third, fourth, fifth and sixth bridge motors 109, 109', 107, 107', 104, 104' are unlocked. The multifunctional lock platform transport mechanism 202 is unlocked to move, and the gully-crossing bridge is adjusted to locate above crevasses, and then the multifunctional lock platform transport mechanism 202 is locked again. The multifunctional lock platform lifting mechanism 207 lowers the gully-crossing bridge, so that it bridges two sides of the crevasses.

Crossing the gully is described as follows. As the gully-crossing vehicle travels forward, when the third and fourth crawler travelling feet 401, 401' contact the gully-crossing bridge, the third, fourth, fifth and sixth crawler travelling feet 401, 401', 501, 501' stop travelling, and the front bottom plate 203 and the top platform 201 are unlocked, and the front bottom plate 203 slides forward relative to the front bottom plate 203. At the same time, the first and second crawler travelling feet 308, 308' travel forward. When the font bottom plate 203 slides to a limit position, the front bottom plate 203 and the top platform 201 are locked, and the first, second, third, fourth, fifth and sixth crawler travelling feet 308, 308', 401, 401', 501, 501' simultaneously travel forward. When the fifth and sixth crawler travelling feet 501, 501' contact the gully-crossing bridge, the fifth and sixth crawler travelling feet 501, 501' stop travelling, and the rear bottom plate 205 and the top platform 201 are unlocked, and the top platform 201 travels forward relative to the rear bottom plate 205. At the same time, the first, second, third, fourth, fifth and sixth crawler travelling feet 308, 308', 401, 401', 501, 501' simultaneously travel forward. When the top platform 201 slides to a limit position, the rear bottom plate 205 and the top platform 201 are locked, and the first, second, third, fourth, fifth and sixth crawler travelling feet 308, 308', 401, 401', 501, 501' simultaneously travel forward. When the rear of the top platform 201 crosses the head of the gully-crossing bridge, the first, second, third and fourth crawler travelling feet 308, 308', 401, 401' stop travelling, and the rear bottom plate 205 and the top platform 201 are locked, and the rear bottom plate 205 travels forward relative to the top platform 201. At the same time, the fifth and sixth crawler travelling feet 501, 501' continue to travel forward. When the rear bottom plate 205 slides to the initial position, the fifth and sixth crawler travelling feet 501, 501' stop travelling, and the rear bottom plate 205 and the top platform 201 are locked; the front bottom plate 203 and the top platform 201 are unlocked, and the front bottom plate 203 slides rearwards relative to the top platform 201. At the same time, the first and second crawler travelling feet 308, 308' travel rearwards. When the front bottom plate 203 slides to the initial position, the first and second crawler travelling feet 308, 308' stop travelling, and the front bottom plate 203 and the top platform 201 are locked. During travelling, the multifunctional lock platform transport mechanism 202 cooperates with the multifunctional lock platform lifting mechanism 207 to keep a same relative location between the multifunctional lock platform lifting mechanism 207 and the gully-crossing bridge.

Lifting and unlocking of the bridge body is described as follows. The gully-crossing bridge is lifted to the initial position by the multifunctional lock platform lifting mechanism 207, and is locked. The first, second, third, fourth, fifth, sixth bridge motor shafts 106, 106', 102, 102', 101, 101' are locked. The movement of the first, second, third, fourth, fifth and sixth bridge electronic control rotation and extension mechanisms 108,108', 105,105', 103, 103' are locked. The first, second, third, fourth, fifth and sixth bridge motors 109, 109', 107, 107', 104, 104' are locked. The left and right underside lock pins 120, 120' are withdrawn by the third and fourth bridge underside lock mechanisms 114, 114', and are unlocked. The left and right side lock pins 119, 119' are withdrawn by the third and fourth bridge inner side lock mechanisms 117, 117', and are unlocked. The extension locking member 210 is withdrawn, so that the gully-crossing bridge is unlocked. The multifunctional lock platform 208 is lifted to the initial position by the multifunctional lock platform lifting mechanism 207. The multifunctional lock platform lifting mechanism 207 is moved to the middle of the bottom of the gully-crossing vehicle, and is locked.

Withdrawing the first and second bridge bodies is described as follows. The first and second bridge electronic control rotation and extension mechanisms 108, 108' are unlocked to rotate, and drive the first and second bridge bodies 112, 112' to rotate outwardly by 90°, so that the first and second bridge bodies are in a vertical position, and then the first and second bridge electronic control rotation and extension mechanisms 108, 108' are locked again. The first and second electronic control rotation and extension mechanisms 108 and 108' are unlocked to move and are withdrawn to the prearranging bridge position, and then they are locked again. The first and second bridge motor shafts 106, 106' are unlocked and are rotated to the initial position, and then they are locked again. The first and second electronic control rotation and extension mechanisms 108, 108' are unlocked to rotate and drive the first and second bridge bodies 112 , 112' to rotate reversely by 90° to return to the initial position, and then they are locked again. The first and second bridge motors 109, 109' are unlocked and rotate to adjust the fifth and sixth bridge bodies 112, 112', so that the fifth and sixth bridge bodies are in a horizontal state, and the fifth and sixth bridge motors are locked again.

Withdrawing the third and fourth bridge bodies is described as follows. The third and fourth bridge electronic control rotation and extension mechanisms 105, 105' are unlocked to rotate, and drive the third and fourth bridge bodies 111, 111' to rotate outwardly by 90°, so that the third and fourth bridge bodies are in a vertical state, and then they are locked again. The third and fourth electronic control rotation and extension mechanisms 105, 105' are unlocked to move and are withdrawn to the initial position, and then they are locked again. The third and fourth bridge motor shafts 102, 102' are unlocked and are rotated to the initial position, and then they are locked again. The third and fourth electronic control rotation and extension mechanisms 105, 105' are unlocked to rotate and drive the third and fourth bridge bodies 111, 111' to rotate reversely by 90° to return to the initial position, and then they are locked again. The third and fourth bridge motors 107, 107' are unlocked and rotate to adjust the third and fourth bridge bodies 111, 111', so that the third and fourth bridge bodies are in a horizontal state, and the third and fourth bridge motors are locked again.

Withdrawing the fifth and sixth bridge bodies is described as follows. The fifth and sixth bridge electronic control rotation and extension mechanisms 105, 105' are unlocked to rotate, and drive the fifth and sixth bridge bodies 111, 111' to rotate outwardly by 90°, so that the fifth and sixth bridge bodies are in a vertical state, and then they are locked again. The fifth and sixth electronic control rotation and extension mechanisms 105, 105' are unlocked to move and are withdrawn to the initial position, and then they are locked again. The fifth and sixth bridge motor shafts 102, 102' are unlocked and are rotated to the initial position, and then they are locked again. The fifth and sixth electronic control rotation and extension mechanisms 105, 105' are unlocked to rotate and drive the fifth and sixth bridge bodies 111, 111' to rotate reversely by 90° to return to the initial position, and then they are locked again. The fifth and sixth bridge motors 107, 107' are unlocked and rotate to adjust the fifth and sixth bridge bodies 111, 111', so that the fifth and sixth bridge bodies are in a horizontal state, and the fifth and sixth bridge motors are locked again.

The above is only some preferred embodiments of the present invention, which are not intended to limit the scope of the present invention. All technical solutions under idea of the present invention should fall within the scope of the present invention. It should be noted that any improvement and modifications made by those skilled in the art without departing from the principle of the present invention shall fall within the scope of the present invention.

What is claimed is:

1. A giant gully-crossing vehicle for polar scientific research, comprising a vehicle body and a gully-crossing bridge;

wherein the vehicle body comprises a stage and a travelling portion; the stage comprises a top platform, a front bottom plate, a rear bottom plate and a multifunctional lock platform assembly; the travelling portion comprises a first travelling component, a second travelling component, a third travelling component, a fourth travelling component, a fifth travelling component and a sixth travelling component which are symmetrically provided at left and right sides of the stage and below the stage; the gully-crossing bridge comprises a first bridge component, a second bridge component, a third bridge component, a fourth bridge component, a fifth bridge component and a sixth bridge component which are symmetrically provided on left and right sides of the stage.

2. The giant gully-crossing vehicle of claim 1, wherein the first bridge component comprises a first bridge body, a first rotation and extension mechanism, a first bridge underside lock mechanism and a first bridge inner side lock mechanism; one end of the first rotation and extension mechanism is connected to a front portion of a left side of the top platform, and the other end of the first rotation and extension mechanism is connected to the first bridge body; the first bridge underside lock mechanism is provided under an outer side of a tail of the first bridge body; the first bridge inner side lock mechanism is provided at an inner side of the tail of the first bridge body; and the second bridge component symmetrical to the first bridge component is provided at a right side of the top platform.

3. The giant gully-crossing vehicle of claim 1, wherein the third bridge component comprises a third bridge body, a third rotation and extension mechanism, a third bridge underside lock mechanism and a third bridge inner side lock mechanism; one end of the third rotation and extension mechanism is connected to a middle portion of a left side of the top platform, and the other end of the third rotation and extension mechanism is connected to the third bridge body; the third bridge underside lock mechanism is provided under front and rear portions of the third bridge body; the third bridge inner side lock mechanism is provided at an inner side of the third bridge body; the fourth bridge component symmetrical to the third bridge component is provided at a right side of the top platform.

4. The giant gully-crossing vehicle of claim 1, wherein the fifth bridge component comprises a fifth bridge body, a fifth rotation and extension mechanism, a fifth bridge underside lock mechanism and a fifth bridge inner side lock mechanism; one end of the fifth rotation and extension mechanism is connected to a rear portion of a left side of the top platform, and the other end of the fifth rotation and extension mechanism is connected to the fifth bridge body; the fifth bridge underside lock mechanism is provided under an outer side of a head portion of the fifth bridge body; the fifth bridge inner side lock mechanism is provided at an inner side of the head portion of the fifth bridge body; and the sixth bridge component symmetrical to the fifth bridge component is provided at a right side of the top platform.

5. The giant gully-crossing vehicle of claim 1, wherein the front bottom plate is provided on a bottom of a front portion of the top platform; the rear bottom plate is provided on a bottom of a rear portion of the top platform; the multifunctional lock platform assembly comprises a multifunctional lock platform transport mechanism, a multifunctional lock platform lifting mechanism and a multifunctional lock platform; a top of the multifunctional lock platform transport mechanism is connected to a bottom of the top platform, and a bottom of the multifunctional lock platform transport mechanism is connected to a top of the multifunctional lock platform lifting mechanism.

6. The giant gully-crossing vehicle of claim 1, wherein the first travelling component comprises a first rotation support base, a first rotation support, a first telescopic support, a first auxiliary support, a first electric drive gear lifting mechanism, a first crawler travelling foot, an upper position limit member and a lower position limit member; a top of the first rotation support base is connected to a bottom of a left front portion of the front bottom plate, and a lower end of the first rotation support base is connected to an upper end of the first rotation support; a lower end of the first rotation support is connected to an upper end of the first telescopic support; a lower end of the first telescopic support is connected to an upper end of the first crawler travelling foot; an upper end of the first auxiliary support is connected to an outer side of the first rotation support, and a lower end of the first auxiliary support is connected to the lower end of the first telescopic support; the first electric drive gear lifting mechanism is provided at the lower end of the first rotation support; and the second travelling component symmetrical to the first travelling component is provided at a bottom of a right front portion of the front bottom plate.

7. The giant gully-crossing vehicle of claim 1, wherein the third travelling component comprises a third rotation support base, a third rotation support, a third telescopic support, a third auxiliary support, a third electric drive gear lifting mechanism and a third crawler travelling foot; an upper end of the third rotation support base is connected to a bottom of a left middle portion of the top platform, and a lower end of the third rotation support base is connected to an upper end of the third telescopic support; a lower end of the third telescopic support is connected to an upper end of the third telescopic support; a lower end of the third telescopic support is connected to an upper end of the third crawler travelling foot; an upper end of the third auxiliary support is provided at an outer side of the third rotation support, and a lower end of the third auxiliary support is connected to the lower end of the third telescopic support; the third electric drive gear lifting mechanism is provided at the lower end of the third rotation support; and the fourth travelling component symmetrical to the third travelling component is provided at a bottom of a right middle portion of the top platform.

8. The giant gully-crossing vehicle of claim 1, wherein the fifth travelling component comprises a fifth rotation support base, a fifth rotation support, a fifth telescopic support, a fifth auxiliary support, a fifth electric drive gear lifting mechanism and a fifth crawler travelling foot; a top of the fifth rotation support base is connected to a bottom of a left rear portion of the rear bottom plate, and a lower end of the fifth rotation support base is connected to an upper end of the fifth rotation support; a lower end of the fifth rotation support is fixed to an upper end of the fifth crawler travelling foot; an upper end of the fifth auxiliary support is provided at an outer side of the fifth rotation support, and a lower end of the fifth auxiliary support is connected to the lower end of the fifth telescopic support; the left rear electric drive gear lifting mechanism is provided at the lower end of the left front rotation support; and the sixth travelling component symmetrical to the fifth travelling component is provided at a bottom of a right rear portion of the rear bottom plate.

9. The giant gully-crossing vehicle of claim 5, wherein the multifunctional lock platform comprises a lock platform body and an extension lock member; four holders are provided at left and right sides of the lock platform body, and the extension lock member is provided below the holders.

* * * * *